(No Model.)
W. C. BROWN.
HORSE DETACHING DEVICE.
No. 568,834. Patented Oct. 6, 1896.
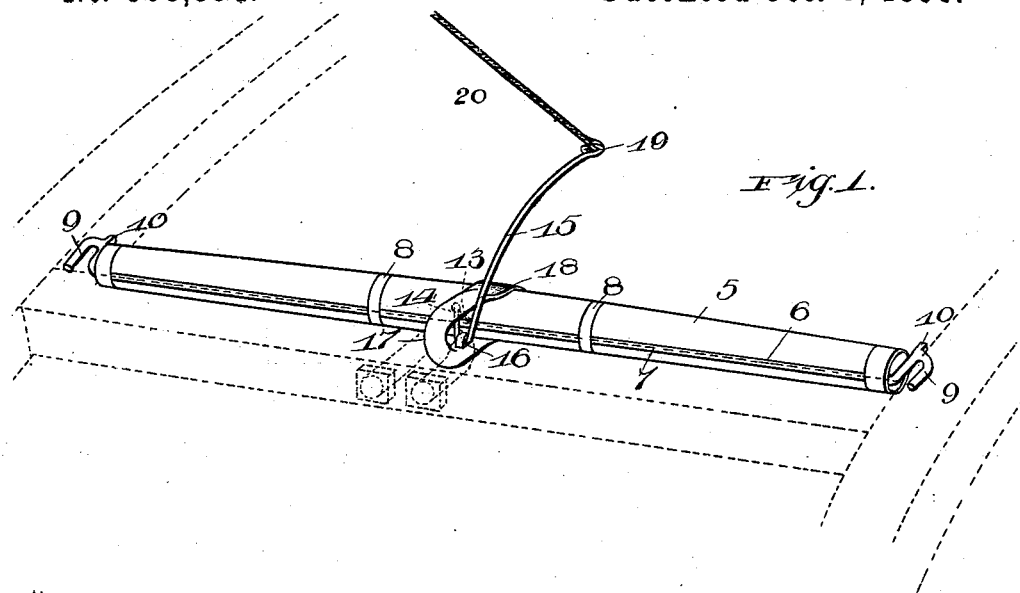
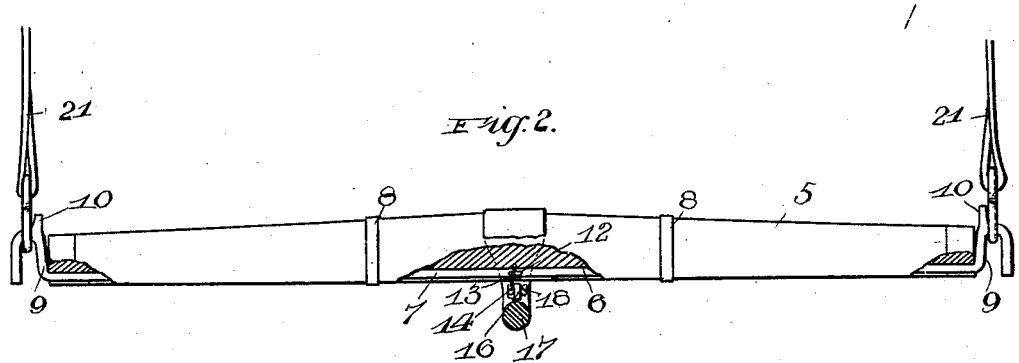
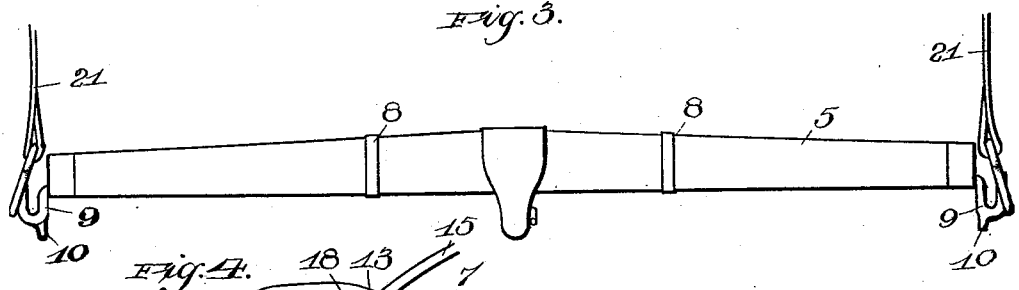
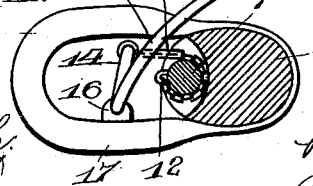
Witnesses
Inventor
Wilford C. Brown,
By H. B. Willson
Attorney

UNITED STATES PATENT OFFICE.

WILFORD C. BROWN, OF SINAI, KENTUCKY.

HORSE-DETACHING DEVICE.

SPECIFICATION forming part of Letters Patent No. 568,834, dated October 6, 1896.

Application filed June 10, 1896. Serial No. 594,988. (No model.)

*To all whom it may concern:*

Be it known that I, WILFORD C. BROWN, a citizen of the United States, residing at Sinai, in the county of Anderson and State of Kentucky, have invented certain new and useful Improvements in Horse-Detaching Devices; and I do declare the following to be a full, clear, and exact description of the invention, such as will enable others skilled in the art to which it appertains to make and use the same.

My invention has relation to horse-detaching devices, and more particularly to that class of inventions intended to release the animals from the thills or pole when an accident or runaway occurs; and the object is to provide a simple and reliable device of this kind that can be depended upon in an emergency; and to this end the novelty consists in the construction, combination, and arrangement of the same, as will be hereinafter more fully described, and particularly pointed out in the claim.

In the accompanying drawings the same figures of reference indicate the same parts of the invention.

Figure 1 is a perspective view of a pair of thills and singletree embodying my invention. Fig. 2 is a top plan view, partly in section, of the singletree detached from the thills with the traces attached. Fig. 3 is a similar view showing the manner of releasing the traces, and Fig. 4 is a cross-section of the singletree on the line of the detaching-lever.

5 represents the singletree, and its rear part is formed with a longitudinal semicircular recess 6, in which is located an oscillating shaft 7, held in place by bands 8 8. The ends of this shaft are formed with integral trace-hooks 9 9, each one of which has formed integral with it an arm or lug 10.

12 is an eyebolt on the shaft 7, to which is secured one end of a chain 13, which extends partly around the shaft, and its other end is secured to the shorter arm 14 of a bent lever 15, fulcrumed in a bracket 16 on the strap 17, the longer arm 18 of the lever 15 extending forward and upward and terminating in an eye 19, to which is attached a rope 20, the end of which is within reach of the occupant or driver of the vehicle.

The traces 21 21 being attached to the hooked ends of the shaft 7, as shown, if the rope 20 be pulled to raise the lever 15 it operates the chain 13 to rotate or oscillate the shaft 7 one-half of a revolution. This operation turns the hooks 9 9 completely around, so as to completely free the ends of the traces and clear the animal from the thills, the lugs 10 preventing the end of the trace from slipping back on the shaft.

Having thus fully described my invention, what I claim as new and useful, and desire to secure by Letters Patent of the United States, is—

As an improved article of manufacture, a singletree 5, formed with a longitudinal semicircular recess 6 in which is secured by bands 8 8 the oscillating shaft 7, its outer ends formed with integral trace-hooks 9 9 and lugs 10 10, and provided with the eyebolt 12, in combination with the chain 13 secured to the shorter arm 14 of the operating-lever 15 fulcrumed in the bracket 16 on the strap 17, its upwardly-extending longer arm formed with an eye 19 to which is attached a rope 20, substantially as and for the purpose set forth.

In testimony whereof I hereunto affix my signature in presence of two witnesses.

WILFORD C. BROWN.

Witnesses:
R. G. MAJES,
S. C. ROBINSON.